(12) United States Patent
Allender

(10) Patent No.: US 6,405,673 B1
(45) Date of Patent: Jun. 18, 2002

(54) BIRD SEED COLLECTOR

(76) Inventor: Michael L. Allender, 90368 Baker Rd., Elmira, OR (US) 97437

( * ) Notice: Subject to any disclaimer, the term of this patent is extended or adjusted under 35 U.S.C. 154(b) by 0 days.

(21) Appl. No.: 09/606,951

(22) Filed: Jun. 30, 2000

(51) Int. Cl.$^7$ ............................................. A01K 61/02
(52) U.S. Cl. .................... 119/52.1; 119/52.1; 119/52.2; 119/52.3; 119/469; 119/53.5
(58) Field of Search ................. 119/52.1, 2, 3, 119/4, 53.5, 57.4, 8, 9, 469, 32

(56) References Cited

U.S. PATENT DOCUMENTS

| | | | | |
|---|---|---|---|---|
| 250,600 A | * | 12/1881 | Taft | 119/459 |
| 363,879 A | * | 5/1887 | Armstrong | 119/469 |
| 1,094,423 A | * | 4/1914 | Brandt | 119/469 |
| 1,450,175 A | * | 4/1923 | Honsinger | 119/52.1 |
| D68,941 S | * | 12/1925 | Schwartz | 119/469 |
| 2,028,612 A | * | 1/1936 | Kosvich | 119/469 |
| 2,715,386 A | * | 8/1955 | Brant | 119/51.5 |
| 3,916,836 A | * | 11/1975 | Justl | 119/428 |
| 4,327,669 A | * | 5/1982 | Blasbalg | 119/57.8 |
| 4,829,934 A | * | 5/1989 | Blasbalg | 119/57.8 |
| 4,940,019 A | * | 7/1990 | Coffer | 119/52.2 |
| 5,095,847 A | * | 3/1992 | Coffer | 119/52.2 |
| 5,150,665 A | * | 9/1992 | Boaz | 119/52.3 |
| 5,711,247 A | * | 1/1998 | Henshaw | 119/469 |
| 5,775,256 A | * | 7/1998 | Henshaw | 119/116 |
| 5,957,086 A | * | 9/1999 | Gallardo | 119/429 |
| 5,988,111 A | * | 11/1999 | Kujath | 119/432 |
| 6,253,706 B1 | * | 7/2001 | Sloop | 119/52.3 |

* cited by examiner

Primary Examiner—Charles T. Jordan
Assistant Examiner—Stephen Holzen
(74) Attorney, Agent, or Firm—James D. Givnan, Jr.

(57) ABSTRACT

A bird seed collector is located beneath a bird seed feeder and is attached to the feeder for receiving seed dislodged from the feeder. A mesh barrier extends adjacent an open end of the collector permitting seed passage while barring entry of birds or rodents into the collector. A cross member in the collector receives a hook for feeder attachment. The barrier is shaped to occupy a cross sectional area of the downwardly convergent shaped collector which prevents tipping of the barrier. Engagement of the cross member and barrier additionally supports the barrier against displacement. The collector may be formed from flexible sheet material.

9 Claims, 1 Drawing Sheet

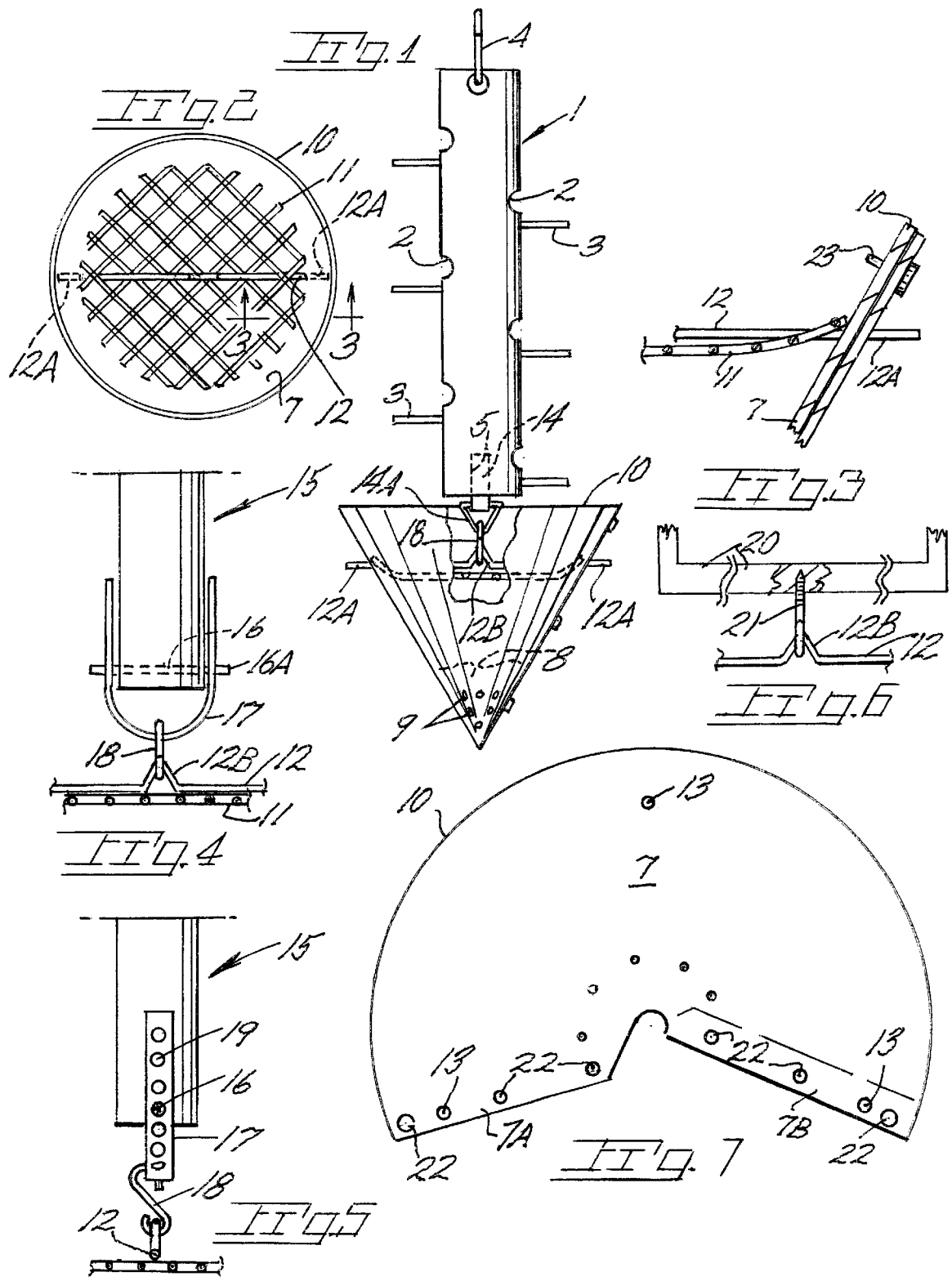

BIRD SEED COLLECTOR

BACKGROUND OF THE INVENTION

The present invention pertains to the collection of seed gravitating from a wild bird feeder.

To a considerable extent bird seed in a wild bird feeder is wasted by the manner in which birds tend to discard viable, whole seeds in their selection of desired seeds. The unwanted seed normally gravitates to a surface under the feeder, such as the ground or man made substrates including decks and walkways, whereat it creates an unsightly mess, attracts rodents, or may even germinate, resulting in undesired ground cover. Another problem with the accumulation of seed on the ground or other substrate is that the seed can be-come moistened by rain or irrigation and contaminated by bird feces, both of which encourage the growth of mold and fungus contagions. Birds walking in and eating this contaminated seed then pass on disease to other birds, including Salmonellosis, Aspergillosis, house finch disease and avian pox. According to the USGS, Salmonellosis has been confirmed as a cause of death in passerine birds in all fifty states.

The desirability of collecting uneaten seed from bird feeders has been considered with the following U. S. patents disclosing various types of seed collectors.

U. S. Pat. No. 5,988,111 discloses a bird seed collector of platform shape suspended below a bird feeder with the collector having an expanse of screen carried by a frame.

U. S. Pat. Nos. 5,775,256 and 5,711,247 disclose a bird seed collector platform supported on a bird feeder post. The collectors utilize a screen in a framework.

U. S. Pat. Nos. 5,095,847 and 4,940,019 disclose a bird seed collector in combination with a bird feeder wherein the uneaten seed gravitates into a bowl shaped collector having a removable stopper at its lower end for seed discharge.

SUMMARY OF THE PRESENT INVENTION

The present invention is embodied within a collector for disposition below a bird feeder which prevents birds and rodents access to collected bird seed with provision made for attachment of the collector to a range of bird feeders.

As bird feeders come in a wide variety of shapes, sizes and structural features, it is highly desirable to provide a collector for use with a majority of known bird feeder designs.

A downwardly convergent main body of the present collector is provided with a perforate barrier through which seed may pass but which prevents access to the collected seed by birds or animals that may be attracted by its presence. The main body of the collector is of light weight material, of either flexible or semi rigid construction, of downwardly convergent configuration and having an upper end of an expanse to collect virtually all of the seed displaced by birds during feeding. The perforate barrier occupies an area in the main body below the rim and may contact the main body to preclude tipping if alighted on. Attachment means of collector centrally locates the main body with respect to the superjacent bird feeder. The main body may be free to tip to discourage rodents from clinging to the collector.

Important objectives of the present invention include the provision of a collector for wasted bird seed of convergent configuration with a perforate barrier therein to enable seed passage while prohibiting the entry of birds or small animals seeking the waste seed therein; the provision of collector for suspension beneath a bird feeder with provision of attachment means compatible with a range of bird feeder designs; the provision of a seed collector having a perforate barrier securely supported therein against tipping in the collector main body by reason of having contact around its perimeter with the inner periphery of the main body; the provision of a bird seed collector which may be emptied periodically by passing collected seed back through the barrier; the provision of a seed collector which may be easily disassembled for periodic cleaning and decontamination; the provision of a seed collector having a main body which may be formed from either semi rigid injection molded or extruded flexible material which facilitates low cost production and packaging costs; the provision of a seed collector attachment means serving to both suspend the collector from a feeder and secure the barrier to the main body of the collector.

BRIEF DESCRIPTION OF THE INVENTION

In the accompanying drawings:

FIG. 1 is side elevational view of a bird feeder having the present collector thereon;

FIG. 2 is a plan view of the present collector removed from the bird feeder;

FIG. 3 is a vertical sectional view taken along line 3—3 of FIG. 2;

FIG. 4 is a fragmentary elevational view of the lower end of a bird feeder with a modified form of collector attachment means;

FIG. 5 is a side elevational view of FIG. 4;

FIG. 6 discloses a still further form of attachment means for the collector.

FIG. 7 is a plan view of the collector main body in planar form prior to assembly into a convergent configuration;.

DETAILED DESCRIPTION OF THE PREFERRED EMBODIMENTS

With continuing attention to the drawings wherein applied reference numerals indicate parts similarly hereinafter identified, the reference numeral I indicates generally a bird feeder which may be of cylindrical shape having a series of openings 2 and perches 3 with a bail at 4 to facilitate attachment to an overhead support.

Some bird feeders of the type shown are provided with an internally threaded socket indicated at 5 ordinarily utilized for attachment to the threaded upper end 14 of a ground supported post. If desired, the bird feeder may be supported by bail 4.

A main body 7 of the present collector is of downwardly convergent shape, as for example, that of a cone, to provide a seed collecting area at 8. Area 8 may be provided with openings at 9 for the discharge of collected moisture. A rim 10 of the collector extends radially beyond the lower end of bird feeder I to provide sufficient entry area to collect virtually all of the bird seed dislodged by feeding birds.

A perforate barrier at 11 is located in a recessed manner below the top edge 10 of the collector and may be positioned to suit the user's choice. Barrier 11 may be a plastic or metal mesh with adequate rigidity to maintain a substantial planar shape to occupy a cross sectional area of the collector and hence prevent passage by birds or small animals. The perimeter of barrier 11 is in contact with the inner wall of main body 7 to further stabilize the barrier.

A cross member 12 has end segments 12A which extend through openings in the perforate barrier and contribute to stabilizing the latter. Attachment of the collector to bird feeder is by means of an S-hook 18 engaging cross member 12 at an upwardly angulated segment 12B thereof. A threaded insert at 14 has a V-shaped bail 14A to receive hook 18. End segments 12A of the cross member project through apertures as at 13 in the main body.

A modified form of attachment means is shown in FIGS. 4 and 5 wherein the present collector is suspended below a bird feeder indicated generally at 15. A rod or a perch 16 passes through the wall of the feeder with protruding ends 16A of the rod serving to receive a flexible strap 17 having a series of perforations 19 therealong to permit convenient spacing below the feeder to suit the user's desires. The flexible strap 17 may be cut to length as desired by the user. An S-hook 18 passes through a perforation in strap 17.

In FIG. 6 a still further provision is made for the attachment of the present collector to the lower end of a bird feeder having a bottom wall 20 to which a screw hook 21 is attached to receive a segment 12B of cross member 12. Accordingly, the collector is attachable to a wide variety of bird feeders.

With attention to FIG. 7, main body 7 may be formed from a sheet of polyethylene or other material to permit assembly into convergent configuration. Openings at 22 are registrable with one another along overlapping marginal areas at 7A–7B to permit insertion of plastic locking pins 23 (FIG. 3) or other fasteners. The plastic pins are termed "push pins" in the trade and are desirable for ease of use. Alternatively, rivets or hook and loop material may also be used. Main body 7 may be otherwise shaped, as for example, pyramidal or bowl shaped, and also may be of die formed or injection molded construction to contribute to a low cost of manufacture by taking advantage of high volume production methods.

In use, the present collector may be sold in kit form wherein the components lend themselves to low cost packaging and simple assembly without tools. The attachment means render the collector attachable to a wide range of bird feeders, also requiring simple attachment tasks on the user's behalf The main body 7 may be formed from other than impervious sheet material.

While I have shown but a few embodiments of the invention, it will be apparent to those skilled in the art that the invention may be embodied still otherwise without departing from the spirit and scope of the claimed invention.

Having thus described the invention, what is desired to be secured by a Letters Patent is:

I claim:

1. A bird seed collector for hung placement below a bird feeder of the hanging type and including, a main body of downwardly convergent configuration, a barrier in place on the main body and of a perforate nature to permit passage of seeds while preventing access of birds and rodents to the seed, and attachment means including a cross member having ends in an inserted engagement with the main body and having hook means centrally disposed on said cross member for attachment to the birdfeeder.

2. The collector claimed in claim 1 wherein said attachment means includes a threaded insert having a V-shaped bail for engagement with the bird feeder.

3. The collector claimed in claim 1 wherein said attachment means includes a strap of perforate construction and means projecting from a bird feeder for passage through strap perforations.

4. The collector claimed in claim 3 wherein said strap is of pliable synthetic material to facilitate altering of strap length by cutting to adapt the collector to feeders of different size and the vertical distance between the collector and a bird feeder.

5. The collector claimed in claim 1 wherein the main body of the collector is of conical shape.

6. The collector claimed in claim 5 wherein the main body is formed from flexible plastic sheet material.

7. The collector claimed in claim 6 wherein said cross member projects through the wall of the main body.

8. The collector claimed in claim 1 wherein said hook means includes a threaded insert for engagement with the bird feeder.

9. The collector claimed in claim 1 wherein said cross member is in inserted engagement with said barrier and said main body.

\* \* \* \* \*